Patented May 21, 1929.

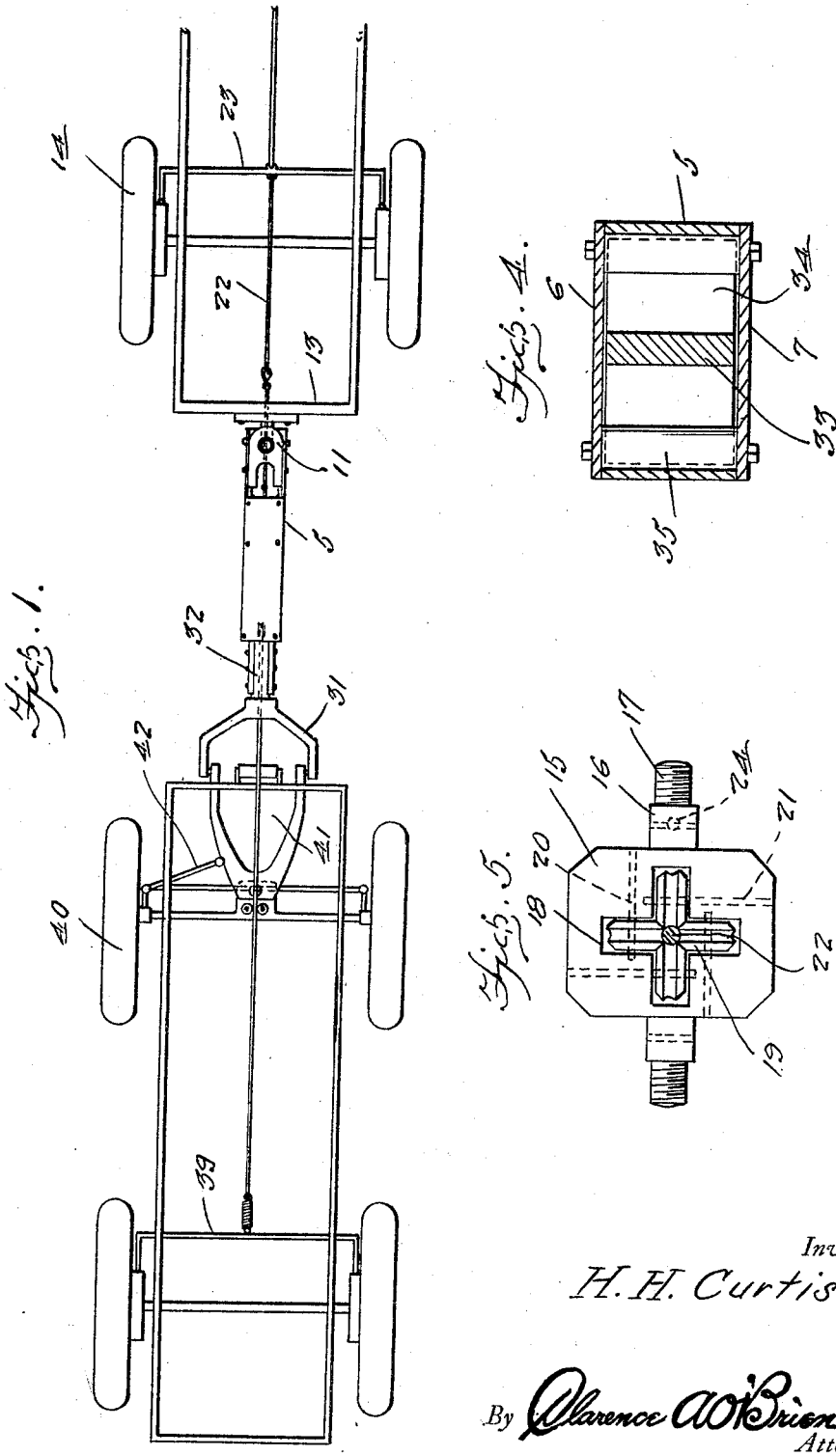

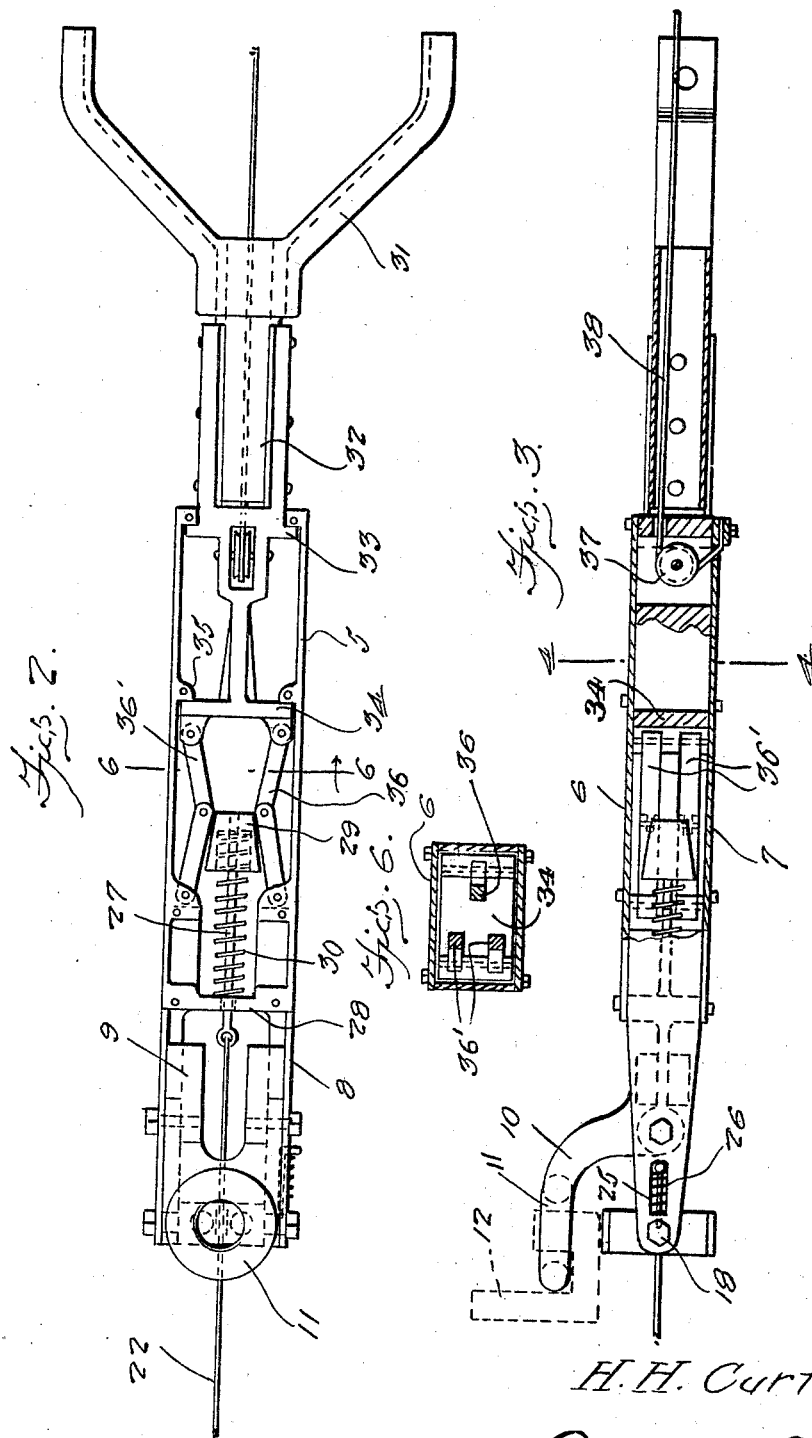

1,713,950

UNITED STATES PATENT OFFICE.

HARRY H. CURTIS, OF HUNTINGTON BEACH, CALIFORNIA.

TRAILER COUPLING.

Application filed February 20, 1928. Serial No. 255,743.

The present invention relates to couplings for trailer vehicles and has for its object to provide a coupling of this character composed of a pair of relatively movable sections and adapted through the movement thereof to operate the brake of the trailer.

A further object of the invention is to control the movement of the sections of the coupler through the operation of the brakes of the truck or tractor constituting the moving vehicle, the applying of the brakes of the pulling vehicle serving to release the sections of the coupler so as to permit the relative movement therebetween, the momentum of the trailer serving to cause such movement between the sections of the coupler and such movement to apply the brake of the trailer.

A still further object is to provide a coupler of this character which may be easily and quickly attached in position between the respective vehicles, without necessitating any material changes or alterations in the construction thereof, and at the same time to permit the steering of the trailer in accordance to the direction in which the pulling vehicle is driven, which is simple and practical in construction, efficient and reliable in performance, relatively inexpensive to manufacture and otherwise well adapted to the purposes for which the same is intended.

Other objects and advantages reside in the special construction and combination of the various elements comprising the invention, reference being had to the accompanying drawings forming a part hereof, wherein:

Figure 1 is a top plan view showing the coupler in operative position,

Figure 2 is a plan view of the coupler with the cover plate removed and illustrating the connection for the brake operating cable for the brakes of the vehicle.

Figure 3 is a side elevational view with parts shown in section,

Figure 4 is a transverse sectional view taken substantially on the line 4—4 of Figure 3, Figure 5 is a front elevational view and Figure 6 is a transverse sectional view taken substantially along a line 6—6 of Figure 2.

Referring now to the drawings in detail, the invention comprises a vehicle coupler including a substantially rectangular coupler housing 5, open at each end and having upper and lower cover plates 6 and 7 respectively secured to the top and bottom sides thereof. The sides of the housing at the front end thereof extend forwardly to form a pair of spaced parallel extensions 8 to the inner faces of which are bolted the ends 9 of an attaching yoke 10, having its opposite end extending forwardly and upwardly and formed into a horizontally disposed ring member 11. The ring member 11 is adapted to fit over an upwardly disposed hook 12 secured to the rear frame member 13 of the truck or pulling vehicle indicated generally at 14. The forward ends of the extensions 8 terminate beneath the ring member 11 and between said ends is carried a cable guide 15 having studs 16 extending at the opposite sides thereof and rotatably journalled in openings formed in the ends of the extensions 8. The ends of the studs 16 are threaded as indicated at 17 for receiving nuts 18 so as to form a securing means for the guide at the end of the extension 8.

The guide 15 is constructed in the form of a substantially rectangular plate and having an opening 18 formed in the center thereof and disposed longitudinally with respect to the coupler and within which opening is rotatably supported a series of rollers 19, arranged in pairs, one pair of rollers being carried on a pair of horizontally disposed shafts 20 with the other pair of rollers mounted on vertically disposed shaft 21 with the edges of each of the rollers in closely associated relation permitting a cable 22 to be extended through the center of the opening 18 for guiding about either of said rollers. The cable 22 has its forward end extended beneath the pulling vehicle 14 and operatively connected with the brake mechanism 23 carried thereon.

As will be seen from an inspection of Figure 3 of the drawing the upper edge of the guide 15 is adapted to engage the under edge of the hook 12 so as to prevent accidental displacement of the ring member 11 from such hook. The studs 16 are provided with transversely extending openings 24 adapted to receive a latch member 25 slidably carried by one of the extensions 8 and normally urged into position for engagement with the studs by means of a coil spring 26.

The rear end of the cable 22 is attached to a rod 27 disposed longitudinally within the coupler housing and arranged for longitudinal sliding movement through the end 28 thereof.

The inner end of the rod 27 is provided with a tapered head 29, a coil spring 30 being carried by the rod engaging said head whereby to normally retain the same in rearwardly extended position.

Arranged at the rear end of the coupler housing 5 is a trailer attaching yoke member 31 having a forwardly extending stem 32 formed intermediate its ends and attached to a side member 33 arranged for longitudinal sliding movement within the housing 5. The inner end of the slide member 33 is formed to a cross bar 34 disposed with its edges in abutting relation with lugs 35 formed in the housing and limiting the rearward movement of the slide member. Arranged within the housing at opposite sides thereof is a pair of sectional links 36' and a sectional link 36 respectively, the rear ends of each of said links being pivotally connected to the cross member 34 with the forward ends thereof similarly connected to a stationary part of the housing. The links are formed in sections pivotally connected to each other and normally disposed with their connected ends extending inwardly in a direction toward each other and in abutting relation with the opposite sides of the head 29.

As will be clearly observed from an inspection of Figure 6 of the drawing the pair of links 36' are disposed in spaced parallel relation so as to receive the pivoted ends of the sections of the links 36 therebetween upon the movement of the links in a direction toward each other, in a manner as will be hereinafter more fully explained.

The slide member 33 carries a pulley wheel 37 about which is arranged a cable 38 having one end fixedly attached to the coupler housing 5 and its opposite end extending rearwardly for connection with the brake rod 39 of the trailer vehicle.

It will thus be apparent that with the coupler connected in position as shown in Figure 1 of the drawing that the trailer indicated generally at 40 will be drawn forwardly with the pulling vehicle 14 and as soon as the brake mechanism 23 of the pulling vehicle is applied the head 29 connected to such brake mechanism through the cable 22 will be drawn forwardly out of engagement with the intermediate portion of the links 36 and 36'. The forward momentum of the trailer 40 will cause the same to push forwardly thereby causing the slide member 33 to move forwardly within the housing 5 and by reason of such movement the pulley 37 will cause the cable 38 to be pulled forwardly thus applying the brake 39 to the trailer. As soon as the brakes of the pulling vehicle have been released the head 29 will be forced rearwardly by the spring 30, and the forward movement of the pulling vehicle will then cause the links 36 and 36' to spread apart and thus release the brakes of the trailer vehicle.

The rear end of the yoke member 31 may be pivotally attached in any suitable manner to the forward portion of the trailer vehicle 40 and if desired may be secured in this manner to the forward end of a tongue 41 provided on the trailer vehicle and operatively connected with the steering mechanism 42 thereof to cause the proper steering of the front wheels of the trailer vehicle upon the turning of the pulling vehicle in either direction.

In order to enable the coupler to be detached from the pulling vehicle, the latch 25 may be released thus permitting the guide 15 to be swung downwardly out of engagement with the hook 12 and the ring member 11 may thus be lifted from said hook.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In a trailer coupler of the class described comprising a pair of relatively movable sections, means for connecting one of said sections with the brake mechanism of a pulling vehicle and adapted to normally secure said sections against movement when such brake mechanism is in normal position, and means for connecting the other of said sections to the brake mechanism of the trailer vehicle and adapted upon the movement of said last named section to operate said last mentioned brake mechanism.

2. In a trailer coupler of the class described comprising a coupler housing adapted for attachment to a pulling vehicle, a slide member arranged within the housing and connected with the brake mechanism of a trailer vehicle, said slide member being rigidly connected to the trailer, means carried by the housing normally securing said slide member against movement and means operable upon the operation of the brakes of the pulling vehicle to release said slide retaining means.

3. In a trailer coupler of the class described comprising a coupler housing, means yieldably carried thereby forming a connection with the brake mechanism of a pulling vehicle, a cable connecting the brake of the trailer with said housing, a slide member arranged within the housing and having means engaging said cable whereby upon the forward movement of said slide member to move the cable in a manner for applying said trailer brake and rigid connecting means between said slide member and the trailer, said yieldable brake connecting means being disposed for normally retaining said slide member against movement, said slide member being operable upon a retarding movement of said pulling vehicle by applying the brake thereof.

4. In a trailer coupler of the class described comprising a coupler housing having means for detachably connecting the same to a pulling vehicle, a rod slidably carried by said housing, a head formed at its rear end thereof, yieldable means normally maintaining said head in inwardly extended position, a cable connecting with said rod with the brake mechanism of the pulling vehicle, a pivotally mounted guide for said cable cooperating with the housing attaching means for securing the same against accidental detachment from the vehicle, a slide member arranged within the housing having a rigid connection with the trailer, a cable connecting the housing with the brake mechanism of the trailer and engaged by said slide member for operating said brake upon the forward movement of the same, a pair of links pivotally attached to said slide member and normally engaged by said head whereby to retain the slide member against forward movement, said slide member being operable through the retarding action of the pulling vehicle caused by the application of the brake thereof whereby to release said links.

In testimony whereof I affix my signature.

HARRY H. CURTIS.